(12) United States Patent
Singer

(10) Patent No.: US 10,353,579 B1
(45) Date of Patent: Jul. 16, 2019

(54) INTERPRETING USER TOUCH GESTURES TO GENERATE EXPLICIT INSTRUCTIONS

(71) Applicant: Disney Enterprises, Inc., Burbank, CA (US)

(72) Inventor: Phillip Singer, Eugene, OR (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/938,869

(22) Filed: Mar. 28, 2018

(51) Int. Cl.
*G06F 3/0488* (2013.01)
*G06F 3/0481* (2013.01)
*G06F 3/0484* (2013.01)
*G06F 3/041* (2006.01)

(52) U.S. Cl.
CPC ........ *G06F 3/04883* (2013.01); *G06F 3/0484* (2013.01); *G06F 3/04812* (2013.01); *G06F 3/04815* (2013.01); *G06F 3/0412* (2013.01)

(58) Field of Classification Search
CPC .................................................. G06F 3/04883
USPC ........................................................ 715/863
See application file for complete search history.

(56) References Cited

U.S. PATENT DOCUMENTS

| 8,502,651 | B2 * | 8/2013 | Birnbaum | A63F 13/10 |
| | | | | 340/407.2 |
| 8,897,491 | B2 * | 11/2014 | Ambrus | G06F 3/0425 |
| | | | | 382/100 |
| 9,448,634 | B1 * | 9/2016 | Wakeford | G06F 3/017 |
| 9,987,554 | B2 * | 6/2018 | Stafford | A63F 13/213 |
| 2014/0298266 | A1 * | 10/2014 | Lapp | G06F 3/04886 |
| | | | | 715/835 |
| 2016/0283081 | A1 * | 9/2016 | Johnston | G06T 19/006 |

OTHER PUBLICATIONS

Google LLC, Gboard—the Google Keyboard—Android Apps on Google Play; https://play.google.com/store/apps/details?id=com.google.android.inputmethod.latin [retrieved on Mar. 28, 2018]; 4 pages.

* cited by examiner

*Primary Examiner* — William D Titcomb
(74) *Attorney, Agent, or Firm* — Esplin & Associate, PC

(57) ABSTRACT

This disclosure relates to interpreting user inputs, including user touch gestures inputs, to generate explicit instructions for an application program running on a computing platform. A user may make an input on a touch-enabled display of the computing platform. The input may trace a path on the application presented on the touch-enabled display. The path includes one or more features, and/or may intersect with virtual objects of the application. The features of the path may be used to generate explicit instructions for the application or the virtual objects of the application. The instructions may facilitate control of the functionality of the virtual objects. The application can be a game and/or other application.

20 Claims, 7 Drawing Sheets

INTERPRETING USER TOUCH GESTURES TO GENERATE EXPLICIT INSTRUCTIONS

FIELD OF THE DISCLOSURE

The present disclosure relates interpreting user touch gestures to generate explicit instructions.

BACKGROUND

A touch gesture made by a user may have meaning within the context of a computer application running on a computing platform. Interpreting the touch gesture or parts of the touch gesture to generate explicit, and usable, instructions may be difficult.

SUMMARY

One aspect of this disclosure relates to interpreting user inputs, including user touch gesture inputs, to generate explicit instructions for an application program running on a computing platform. User input may be made on a touch-enabled display of a computing platform. The user input may include one or more of a body gesture input, a touch gesture input, and/or other user inputs. A touch gesture input may include a movement made by a user's hand and/or finger on the touch-enabled display. The touch input may be interpreted as a set of instructions by the computing platform. The set of instructions may include an instruction to control the application executed on the computing platform and/or elements within the application executed on the computing platform.

The application executed on the computing platform may be one or more of a game, a navigation system, and/or other applications. A game may include a depiction of a simulated physical space, one or more virtual objects, and/or other components. The depiction of a simulated physical space may be a map. The virtual objects may be positioned through the topography of the simulated physical space. The user input made on the touch-enabled display may trace a path on the simulated physical space. The path may be traced by the user with one or more user gestures. The navigation system may be configured to facilitate navigation through a real world via a displayed map. The navigation through the real world may be facilitated by recommending a route through the map that a user may follow. The route may be determined based on a user gesture used to trace a path on the map, and/or other input.

The path traced by the user may define a line traced on the touch-enabled display. The line may be a continuous and/or non-continuous line. The user may perform gestures while tracing the path which may define one or more line features of the line. The line features may be associated with instructions included in a set of instructions. Responsive to the line features being identified in the line defined by the path traced by the user, the set of instructions may be generated. For example, responsive to a first line feature, a second line feature, and/or other line features being identified, a first instruction associated with the first line feature may be generated, a second instruction associated with the second line gesture may be generate, and/or other instructions may be generated for the set of instructions.

In some implementations, a system configured to interpret user input to generate explicit instructions for an application program running on a computing platform may include one or more of one or more servers, one or more computing platforms, one or more external resources, and/or other components. Users may access the system via the computing platforms, and/or other devices. In some implementations, the servers may include one or more of electronic storage, one or more physical processors, and/or other components. In some implementations, the one or more physical processors may be configured by machine-readable instructions. Executing the machine-readable instructions may cause the physical processors to interpret user input to generate explicit instructions and/or other information for an application. The machine-readable instructions may include one or more computer program components. The one or more computer program components may include one or more of a presentation component, an input component, an analysis component, a determination component, an execution component, and/or other components.

In some implementations, the presentation component may be configured to effectuate presentation of an application on a display of the computing platform, and/or other devices. The display may include a touch-enabled display, an LCD display, a LED display, an OLED display, and/or other displays. The application may be one or more of a game, a navigation system, and/or other simulated content. The application may include a depiction of a simulated physical space, one or more virtual objects, and/or other content. The depiction of the simulated physical space may be a map and/or may be depicted in other ways. The virtual objects may be positioned throughout a topography of the simulated physical space of the application.

In some implementations, the input component may be configured to obtain user input information defining user inputs, and/or other information. The input component may obtain the user input through the computing platform, and/or other devices. A user input may comprise one or more of a body gesture input, one or more of a touch gesture input, one or more of a controller input, and/or other inputs. A touch gesture input may be received through a touch-enabled display. The touch gesture input may trace a path on an application presented on the touch-enabled display of the computing platform.

In some implementations, the analysis component may be configured to analyze the user input, and/or other information. The analysis component may be configured to identify the path traced by the user based on the user input information, and/or other information. The analysis component may be configured to identify one or more user gestures used to trace the path. The path may define a line traced by the user. The line may be a continuous or non-continuous line. Continuous may refer to continued touch throughout the tracing of the path. Non-continuous may refer to the user momentarily releasing the touch from the touch-enabled display at one or more locations while tracing the path. The analysis component may be configured to determine one or more line features that make up the line traced by the user.

The analysis component may be configured to determine locations within the application traversed by the path traced by the user. The locations within the application traversed by the path may include locations within the simulated physical space of the application traversed by the path. The analysis component may be configured to determine individual virtual objects that intersect with, and/or are in proximity to, the locations on the simulated physical space traversed by the path. The individual virtual objects that intersect with, and/or are in proximity to, the locations on the simulated physical space traversed by the path may form a virtual object set. A threshold distance may specify a minimum distance for a virtual object to be in proximity to the locations within the map traversed by the path.

In some implementations, the determination component may be configured to determine a set of instructions for the application executed on the computing platform. The set of instructions may include instructions to control/command one or more of the virtual objects within the application and/or to perform other types of control. The determination component may be configured to determine the set of instructions based on the path traced by the user, and/or other information. The determination component may be configured to determine the set of instructions based on the line features that make up the line defined by the path traced by the user. Individual user gestures and/or line features may be associated with individual instructions. The set of instructions may include instructions for the virtual objects the virtual object set. The set of instructions may be based on functionality of the virtual object in the virtual object set.

In some implementations, the execution component may be configured to execute the set of instructions on the application, and/or other information. The execution component may be configured to provide the computing platform with the set of instructions, and/or other information, such that the computing platform may be enabled to execute the set of instructions on the application. The executed set of instructions may be presented on the display of the computing platform.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1:
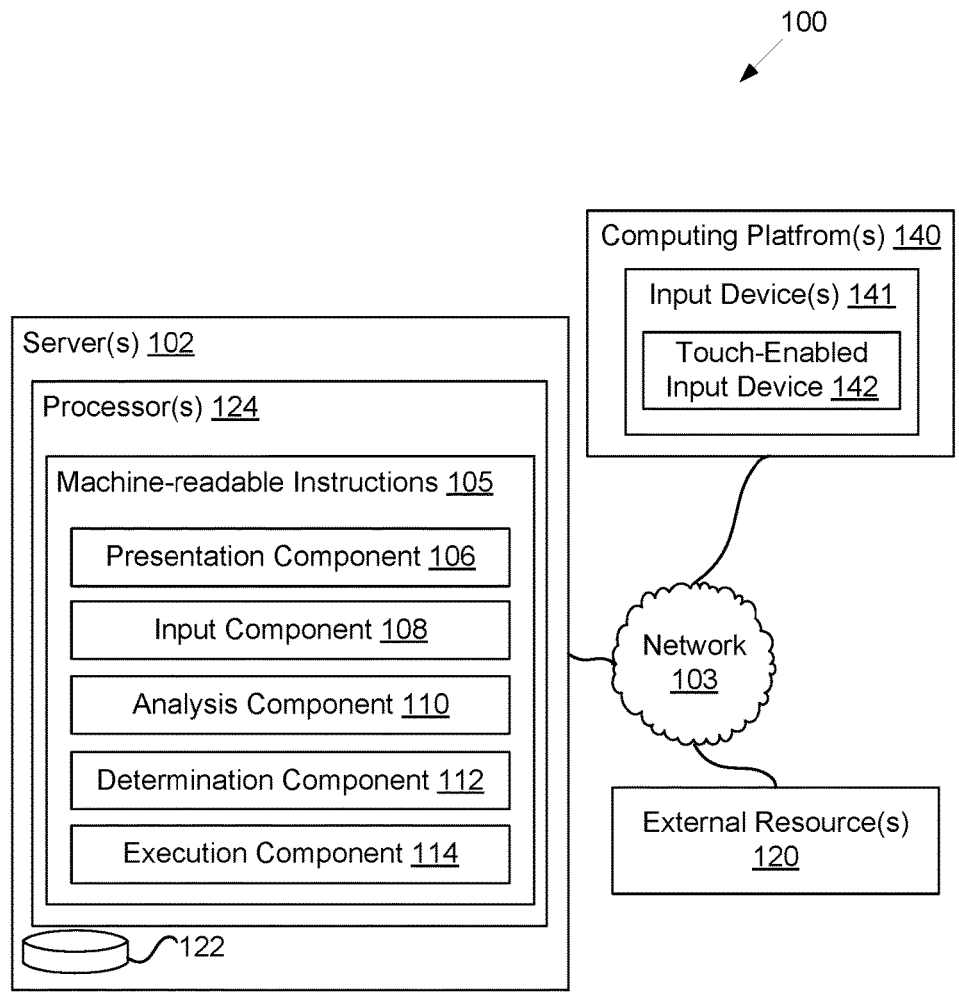
FIG. 1 illustrates a system configured to interpret user input, including touch gesture inputs, to generate explicit instructions for an application program running on a computing platform, in accordance with one or more implementations.

FIG. 1 illustrates a system 100 configured to interpret user inputs, including user touch gestures input, to generate explicit instructions for an application program running on a computing platform. User input may be obtained by a touch-enabled display and/or other components of the computing platform. User input may trace a path on a map of an application executed on the computing platform. The path traced by the user on the map may be interpreted as a set of instructions for the application. One or more user gestures may be used by the user to trace the path. The one or more user gestures may define the features of the path. For example, the path may define a continuous or non-continuous line, and the user gestures may define line features of the line. Continuous may refer to continued touch throughout the tracing of the path. Non-continuous may refer to the user momentarily releasing the touch from the touch-enabled display at one or more locations while tracing the path. The individual user gestures and/or line features may be associated with instructions that make up the set of instructions. The individual instructions that make up the set of instructions may be generated responsive to individual user gestures and/or line features being identified. The set of instructions may be executed by the application executed on the computing platform.

As is illustrated in FIG. 1, system 100 may include one or more of one or more servers 102, one or more computing platforms 140, one or more external resources 120, and/or other components. Users may access system 100 via computing platform(s) 140, and/or other devices. Users may communicate with server(s) 102 via computing platform(s) 140, and/or other devices. Server(s) 102 and/or computing platform(s) 140 may access external resource(s) 120, and/or other components of system 100.

Computing platform(s) 140 may be one or more of a mobile device such as a mobile phone, personal computer, a single computer, a network of computers, a wearable computing device such as a head mounted computing device or smart watch, a game console, and/or other computing platforms. Computing platform(s) 140 may include one or more input devices 141, one or more displays, one or more sensors, and/or other components. Input device(s) 141 may include one or more of a computer mouse, a keyboard, a game controller, a touch-enabled input device 142, a motion capture device, an imaging device, and/or other input devices. The touch-enabled input device 142 may include a resistive touchscreen, a capacitive touchscreen, a surface acoustic wave touchscreen, an infrared touchscreen, an optical imaging touchscreen, an acoustic pulse recognition touchscreen, and/or other touchscreens. The motion capture device may include one or more image sensors, motion sensors, depth sensors, and/or other seniors. The motion capture device may be configured to generate output signals conveying motion information defining movements of a user. The imaging device may include one or more image sensors, infrared sensors, depth sensors, and/or other sensors for imaging. The imaging device may be configured to generate output signals conveying visual information defining visual content of a user. The visual content of the user may include movements made by the user. The visual content may be a video/video clip of the user. An imaging device may be a camera or a series of cameras. The displays may include one or more of a touch-enabled display, an LCD display, a LED display, an OLED display, and/or other displays. Computing platform(s) 140 may be associated with a user. The sensors of computing platform(s) 140 may include one or more of an image sensor, audio sensor, and/or other sensors.

In some implementations, an image sensor may be configured to generate output signals conveying visual information, and/or other information. The visual information may define visual content within a field of view of the image sensor and/or other content. The visual content may include depictions of real-world objects and/or surfaces. The visual content may be in the form of one or more of images, videos, and/or other visual information. The field of view of the image sensor may be a function of a position and an orientation of a computing platform. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, an audio sensor may be configured to generate output signals conveying audio information, and/or other information. The audio information may define audio from a user of the audio sensor (e.g., utterances of the user), audio around the user (such as ambient audio), and/or other information. In some implementations, an audio sensor may include one or more of a microphone, a micro-electro-mechanical microphone, and/or other devices.

In some implementations, a depth sensor may be configured to generate output signals conveying depth information within a field of view of the depth sensor, and/or other information. The depth information may define depths of real-world objects and/or surfaces, and/or other information. A field of view of the depth sensor may be a function of a position and an orientation of a computing platform. In some implementations, the depth information may define a three-dimensional depth map of real-world objects and/or a user. In some implementations, the depth sensor may comprise of one or more ultrasound devices, infrared devices, light detection and ranging (LiDAR) devices, time-of-flight cameras, and/or other depth sensors and/or ranging devices. In some implementations, the infrared devices may include one or more infrared sensors. The infrared sensors may generate output signals conveying the depth information.

In some implementations, a repository of information defining individual instructions that make up a set of instructions may be available via server(s) 102 and/or computing platform(s) 140. The instructions may be stored in electronic storage 122, non-transitory storage media, and/or other storage media. The repository of the instructions may be a data structure configured to store information defining the instructions for an application. The repository of the instructions may comprise a computer-readable medium. The data structure configured to store information defining the instructions may be a single database or multiple databases. In some implementations, different executable instructions stored in the data structure may perform different functions. In some implementations, individual instructions may be associated with user gestures, line features, and/or other information.

In some implementations, the association between the individual instructions and the user gestures, line features, and/or other information may be stored in electronic storage 122, non-transitory storage media, and/or other storage media. In some implementations, the association between the individual instructions and the user gestures, the line features, and/or other information may be predetermined. In some implementations, the association between the individual instructions and the user gestures, the line features, and/or other information may be determined by a user. In some implementations, the association between the individual instructions and the user gestures, the line features, and/or other information may be determined by machine learning techniques. The machine learning techniques may include one or more of a convolution neural network, decision tree learning, supervised learning, minimax algorithm, unsupervised learning, semi-supervised learning, reinforcement learning, deep learning, and/or other techniques.

In some implementations, the association between the individual instructions and the user gestures, line features, and/or other information may be determined based on user information. The user information may include one or more user preferences, one or more user input previously obtained, previous instructions executed, and/or other information. The user input previously obtained, previously instructions executed, and/or other information may also be referred to as user history. Based on a user determination of a user preference for an instruction to be associated with user gestures, line features, and/or other information, the instruction may be associated with user gestures, line features, and/or other information. Based on user input previously obtained and the instruction executed based on the user input, the instruction may be associated with the previous user input, and/or other information. Based on previous instructions executed based on user gestures, line features, and/or other information, the previous instructions may be associated with the user gestures, line features, and/or other information.

Server(s) 102 may include one or more of electronic storage 122, one or more physical processors 124, and/or other components. In some implementations, processor(s) 124 may be configured by machine-readable instructions 105. Executing machine-readable instructions 105 may cause processor(s) 124 to interpret user input to generate explicit instructions and/or other information for an application. Machine-readable instructions 105 may include one or more computer program components. The one or more computer program components may include one or more of a presentation component 106, an input component 108, an analysis component 110, a determination component 112, an execution component 114, and/or other components.

Presentation component 106 may be configured to effectuate presentation of an application on the display (e.g., touch-enabled input device 142) of computing platform(s) 140. The application may be one or more of a game, a navigation system, and/or other content. The application may include a depiction of a simulated physical space, one or more virtual objects, and/or other content. The depiction of the simulated physical space may be in the form of a map. The map may be a map of a real-world environment and/or a simulated environment. For example, the map may be a game map and/or a map of a real-world location.

The game may be a video game including one or more of an online game, an offline game, a single player game, a multiplayer game, a local co-op game, and/or other games. The game may include a map including depictions of a simulated physical space of a simulated-environment of the game. The simulated physical space may be an environment in which gameplay of the game takes place.

The navigation system may be configured to facilitate navigation through a real-world via a map. The map may comprise of a depiction of a simulated physical space of a real-world environment, a simulated-environment, and/or other environments. The navigation through the real world may be facilitated by recommending a route through the map that a user may follow. A recommended route may include a route based on time efficiency, a route based on distance, a route based on the mode of transportation, and/or other routes based on other preferences/criteria. The recommended route may include a route in the real-world for interacting with the virtual object set, instructions to recommend a route in a simulated-world (e.g., a game environment/map) for interacting with the virtual object set, and/or other interaction. The route may be determined based on a user gesture used to trace a path on the map, and/or other input.

A simulated physical space may be in a three-dimensional space, two-dimensional space, and/or other simulated physical spaces. The simulated physical space may depict an environment. In some implementations, the simulated physical space may include a head-up display (HUD) overlaid on the three-dimensional, two-dimensional space, and/or other simulated physical spaces. A HUD may comprise of one or more of a mini-map, menu, one or more application information readings, and/or other information.

The virtual objects may be positioned throughout a topography of the simulated physical space of the application. The virtual objects may include one or more virtual entity, virtual structures, and/or other virtual objects. The virtual entity may include a depiction of a character, a group of characters, a vehicle, and/or other entities. In some implementations, the character and/or group of characters may occupy/ride the vehicle. The character may be a depiction of a fictional character and/or a real-world character. The vehicle may be one or more of a motorized vehicle, flying vehicle, and/or vehicles. The virtual entity may be controlled by a user, the application, and/or other controlling systems and/or entities. A virtual structure may include a depiction of a building, a store, a landmark, and/or other virtual structures. In some implementations, the virtual structure may be a representation of a real-world structure. In some implementations, the virtual structure may include the virtual entity, and/or other virtual content. For example, the virtual entity may be within and/or occupy the virtual structure.

The virtual objects may be static or dynamic. For example, the virtual objects may be positioned in a fixed location (e.g., static) or move about locations in the topography of the simulated physical space (e.g., dynamic). In some implementations, the virtual structures and/or virtual entities may be static. In some implementations, the virtual entities may be dynamic. In some implementations, the virtual structures may be static, and the virtual entities may be dynamic.

Input component 108 may be configured to obtain user input information defining user inputs, and/or other information. Input component 108 may obtain the user input information from computing platform(s) 140, external resource(s) 120, and/or other devices. Input component 108 may obtain the user input information captured by input device(s) 141, and/or other devices. The user input information may define a path on the application traced by a user. The path may be traced by the user through input device 142. For example, the path may be traced by a finger of the user through the touch-enabled display of computing platform(s) 140. In some implementations, the user may use a tool to trace the path, for example, a stylus. The user may utilize one or more user gestures to trace the path. The one or more user gestures may make up the path. Individual user gestures may comprise of individual sets of movements. The sets of movements of the user gestures may define one or more features of the path.

For example, a first user gesture that makes up a first part of the path may be traced by a first set of movements, a second user gesture that makes up a second part of the path may be traced by a second set of movements, and other user gestures that make up other parts of the path may be traced by other sets of movements. The first set of movements may be a movement of a finger of the user on a touchscreen in a straight line from a first location to a second location. The second set of movement may be a movement of a finger of the user on the touch screen in a curved line from the first the second location to a third location.

In some implementations, the path may define a continuous line. The user gestures used to trace the path may define line features of the continuous line. The continuous line may comprise of one or more line segments. The line segments may be connected. For example, a distal end and a proximal end of the line segments may be connected to different line segments. Individual line segments that make up the continuous line may include one or more line features. In some implementations, individual line segments that make up the continuous line may include a dominant line feature. The line segments that make up the continuous line may be identified based on the dominant line feature in the line segments.

In some implementations, the path may define a non-continuous line. The user gestures used to trace the path may define line features of the non-continuous line. The non-continuous line may comprise of one or more line segments. The line segments are not connected. For example, a non-continuous line may be a dotted line. The individual dots of the dotted line may be individual line segments. The non-continuous line may be traced by the user when the user momentarily releases the touch from the touch-enabled display at one or more locations while tracing the path. Individual line segments that make up the non-continuous line may include one or more line features. In some implementations, individual line segments that make up the non-continuous line may include a dominate line feature. The line segments that make up the non-continuous line may be identified based on when the line segment began and ended.

A user input may comprise one or more of a body gesture input received through the imaging device, motion capture device, and/or other devices/sensors of computing platform(s) 140, one or more of a touch gesture input received through touch-enabled input device 142 (e.g., a touch screen) of computing platform(s) 140, one or more of a controller input received through input device(s) 141 (e.g., a mouse, a keyboard, and/or a game controller) of computing platform(s) 140, and/or other inputs reveived through other devices.

The body gesture input may include information defining movement of a body part of the user, including movement of a hand, arm, leg, and/or other body parts of the user. A body gesture input may trace a path on an application. For example, the movement of a body part of the user may be mapped onto/associated with the application such that the movement of the body part of the user may trace a path on the application according to the movement of the body part.

In some implementations, the movement of the body part of the user from the user's body gesture input may be interpreted from a video content through image-processing techniques, computer vision techniques, and/or other techniques. In some implementations, the image-processing techniques may include one or more of bundle adjustment, SURF (Speeded-Up Robust Features), ORB (Oriented FAST and rotated BRIEF), computer vision, and/or other techniques. The computer vision techniques may include one or more recognition techniques, motion analysis techniques, image restoration techniques, and/or other techniques The user input information may be mapped onto/associated with the application. The user input information may be mapped onto/associated with the application by associating the user input information with elements of the application. The user input information may be mapped onto/associated with the application by associating the user input information with the map of the application. The user input information may be mapped onto/associated with the application by associating the path traced by the user with the locations within a simulated physical space of the application. The user input information may be mapped onto/associated with the application by associating the line defined by the path traced by the user with the locations within a simulated physical space of the application. In some implementations, the user input information may be mapped onto/associated with the application may be reproduced as a visual component of the application.

The touch gesture input may include information defining one or more movements. The movements may include one or more of a finger press, a finger tap, a finger swipe, a finger flick, a finger drag, a pinch, a touch-and-hold, a scroll, and/or other finger movements. It is noted that these movements may similarly be carried out using a tool, such as a stylus. A touch gesture input may be part of tracing a path on the application presented on computing platform(s) 140. The application may be presented on touch-enabled input device 142 (e.g., touchscreen). For example, a finger dragging across touch-enabled input device 142 of computing platform(s) 140 may trace a path on the application according to the finger dragging. The input of finger dragging across touch-enabled input device 142 may be mapped onto/associated with the application. A finger dragging across touch-enabled input device 142 followed by a finger flick across touch-enabled input device 142 of computing platform(s) 140 may trace a path on the application according to the finger dragging and the finger flick. The input of finger dragging across followed by the finger flick cross touch-enabled input device 142 may be mapped onto/associated with the application.

The controller input may include information defining one or more of a key/button pressing input, a key/button tapping input, a swiping input, a flick input, a drag input, a key/button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs. The press of one or more keys on a keyboard may specify a direction of movement of an input. For example, a press of an up arrow key on a keyboard may specify an upward movement input, a press of the up arrow key and right arrow key on the keyboard may specify upward and rightward movement input.

The controller input may trace a path on the application of computing platform(s) 140. The movements specified by the controller input may trace the path. For example, movement of a mouse from a first position to a second position may trace a path on the application according to movement of the mouse from the first position to the second position. The movement of the mouse from the first position to the second position may be mapped onto/associated with the application.

Analysis component 110 may be configured to determine locations within an application, including the stimulated physical space of the application, presented on computing platform(s) 140 traversed by a path traced by a user. The locations within the application traversed by the path may include locations within the simulated physical space of the application traversed by the path. The locations within the application traversed by the path traced by the user may be based on the user input information, and/or other information. In some implementations, analysis component 110 may be configured to map/associate the path traced by the user onto the application to determine the locations within the application traversed by the path. In some implementations, analysis component 110 may be configured to map/associate the path traced by the user onto the stimulated physical space of the application to determine the locations within the stimulated physical space of the application traversed by the path.

Analysis component 110 may be configured to identify the path traced by the user based on the user input information, and/or other information. Analysis component 110 may be configured to identify the user gestures used to trace the path. Analysis component 110 may be configured to identify the user gestures based on the set of movement used for the user gesture. The set of movements used for the user gesture may be defined by the user input information, and/or other information. In some implementations, analysis component 110 may utilize one or more of the machine learning techniques, image processing techniques, computer vision techniques, and/or other techniques to identify the user gestures used to trace the path.

Analysis component 110 may be configured to identify a line defined by the path traced by the user. Analysis component 110 may be configured to identify a start point, an end point, and/or other features of a line forming the path. The start point may be a location on the stimulated physical space where the user input began. The end point may be a location on the stimulated physical space where the user input ceased. In some implementations, analysis component 110 may be configured to identify a direction of travel at one or more positions of the path traced by the user. In some implementations, analysis component 110 may utilize one or more of the machine learning techniques, image processing techniques, computer vision techniques, and/or other techniques to identify the line defined by the path traced by the user.

Analysis component 110 may be configured to identify line features that make up the line defined by the path. The line may be the continuous line and/or the non-continuous line. The line features may include shapes/patterns of the line/line segment, a speed the line/line segment was drawn/traced, an amount of pressure applied by the user while tracing the line/line segment, smoothness of the line/line segment, and/or other features. The features may be formed by the touch gestures performed by the user while tracing the path. For example, the first line feature may comprise of a straight line, the second line feature may comprise of a curved line, the third line feature may comprise of a zigzag line, and/or other line features may comprise of other features. In some implementations, analysis component 110 may utilize one or more of the machine learning techniques, image processing techniques, computer vision techniques, and/or other techniques to identify the identify line features that make up the line defined by the path.

Analysis component 110 may be configured to identify one or more line segments that make up the line defined by the path traced by the user. For example, the continuous line may include a first line segment, a second line segment, a third line segment, and/or other line segments may make up the path defining a line. A line segment within a path may include a start point and an end point within the path. Different line segments may have different line features. Analysis component 110 may be configured to identify the one or more line segments that make up the continuous line based on the line features of the one or more line segments. In some implementations, analysis component 110 may utilize one or more of the machine learning techniques, image processing techniques, computer vision techniques, and/or other techniques to identify the one or more line segments that make up the continuous line defined by the path traced by the user.

For example, two points within the line with similar line features may be identified as a line segment. The line segment is a part of the line defined by the two points within the line with similar line features. For example, the first line segments may comprise of the straight line, the second line segments may comprise of the curved line, the third line segment may comprise of the zigzag line, and/or other line segments may comprise of other line features.

Analysis component 110 may be configured to identify the one or more line segments that make up the non-continuous line based on the separation between the line segments. In some implementations, analysis component 110 may utilize one or more of the machine learning techniques, image processing techniques, computer vision techniques, and/or other techniques to identify the one or more line segments that make up the non-continuous line defined by the path traced by the user.

In some implementations, analysis component 110 may be configured to identify an amount of pressure applied to touch-enabled input device 142 when the user traced the path. Touch-enabled input device 142 may include pressure sensors. The amount of pressure applied to touch-enabled input device 142 may be defined by the user input information. Analysis component 110 may identify an amount of pressure applied on touch-enabled input device 142 at one or more positions of the path traced by the user. In some implementations, the amount of pressure applied on touch-enabled input device 142 at different positions of the path traced by the user may define a line feature of the line defined by the path traced by the user.

In some implementations, analysis component 110 may be configured to identify a speed the path was traced by the user. A speed the path was traced by the user may be a time the user took to trace a path from a start point to an end point of the line, a time the user took to trace a path from a start point to an end point of a line segment of the line defined by the path traced by the user, and/or other speeds. In some implementations, the speed the path was traced by the user may define a line feature of the line defined by the path traced by the user.

Analysis component 110 may be configured to identify individual virtual objects that intersect with, and/or are in proximity to, the locations on a simulated physical space (e.g., a map) of the application traversed by the path. The individual virtual objects that intersect with, and/or are in proximity to, the locations on the simulated physical space traversed by the path may form a virtual object set.

A threshold distance may specify a minimum distance for the virtual objects to be in proximity to the locations within the simulated physical space traversed by the path. The threshold distance may be predetermined by a user. The threshold distance may be determined based on the amount of pressure applied to touch-enabled input device 142 when the user traced the path, the speed of the path traced by the user, the user gestures used to trace the path, and/or other information. In some implementations, the greater the amount of pressure applied the greater the threshold distance. The smaller the amount of pressure applied the smaller the threshold distance. In some implementations, the greater the speed of the path traced by the user the greater the threshold distance. In some implementations, individual user gestures may be associated with individual threshold distance. Responsive to a first user gesture used to trace the path, a first threshold distance may be used to determine the virtual objects that intersect with, and/or are in proximity to, the locations on the simulated physical space traversed by the path. In some implementations, the threshold distance may range between one to five millimeters, one to three millimeters, two to three millimeters, and/or other distances. In some implementations, the threshold distance may be one millimeter.

In some implementations, analysis component 110 may be configured to identify individual virtual objects that intersect with, and/or are in proximity to, the locations within the simulated physical space (e.g., a map) traversed by a line defined by the path traced by the user. The threshold distance may specify a minimum distance for the virtual objects to be in proximity to the locations within the simulated physical space traversed by the line defined by the path traced by the user. In some implementations, analysis component 110 may be configured to identify individual virtual objects that intersect with, and/or are in proximity to, the locations within the simulated physical space traversed by one or more line segments making up the line defined by the path traced by the user. The threshold distance may specify a minimum distance for the virtual objects to be in proximity to the locations within the simulated physical space traversed by the line segment making up the line defined by the path traced by the user.

Virtual objects that intersect with, and/or are in proximity to, the locations within the simulated physical space traversed by individual line segments may define a group of virtual objects within the virtual object sets. For example, virtual objects that intersect with, and/or are in proximity to, the locations within the map traversed by the first line segment may form a first group of virtual objects, virtual objects that intersect with, and/or are in proximity to, the locations within the map traversed by the second line segment may form a second group of virtual objects, and/or other virtual objects that intersect with, and/or are in proximity to, the locations within the map traversed by other line segments may form other groups of virtual objects.

Determination component 112 may be configured to generate a set of instructions for the application and/or elements of the application executed on computing platform(s) 140. The set of instructions may be instructions for one or more virtual objects of the virtual object set. In some implementations, determination component 112 may be configured to generate the set of instructions based on the user input information and/or other information. In some implementations, determination component 112 may be configured to generate the set of instruction for the application and/or elements of the application based on the set of instructions specified by the user input information. In some implementations, determination component 112 may be configured to generate the set of instructions based on the path traced by the user, and/or other information. Determination component 112 may be configured to generate the set of instructions based on the one or more user gestures that make up the path traced by the user, line features of the line defined by the path traced by the user, the line segments that make up the line, and/or other information.

In some implementations, determination component 112 may be configured to interpret the path traced by the user to generate the set of instructions. Determination component 112 may interpret the path traced by the user to generate the set of instructions with the machine learning techniques, and/or other techniques. In some implementations, determination component 112 may be configured to generate the set of instructions based on associations between features of the path and instructions of the set of instructions. The associations between features of the path and instructions of the set of instructions may be predetermined. The user gestures may specify the features of the path.

In some implementations, determination component 112 may be configured to interpret the user gestures used to trace the path to generate the set of instructions. Determination component 112 may interpret the user gestures to generate the set of instructions with machine learning techniques, and/or other techniques. In some implementations, determination component 112 may be configured to generate a set of instructions based on the association between the user gestures and the instructions.

For example, as described above, individual user gestures may be associated with individual instructions for the set of instructions. Responsive to a user gesture being identified, determination component 112 may be configured to generate an instruction associated with the user gesture for the set of instructions. By way of non-limiting illustration, responsive to the first user gesture being identified, determination component 112 may be configured to generate the first instruction for the set of instructions. Responsive to the second user gesture being identified, determination component 112 may be configured to generate the second instruction for the set of instructions.

In some implementations, determination component 112 may be configured to interpret the line features of the traced path to generate the set of instructions. Determination component 112 may interpret the line features to generate the set of instructions with machine learning techniques, and/or other techniques. In some implementations, determination component 112 may be configured to generate a set of instructions based on the association between the line features and the instructions.

For example, as described above, individual line features may be associated with individual instructions for the set of instructions. Responsive to a line feature being identified, determination component 112 may be configured to generate an instruction associated with the line feature for the set of instructions. By way of non-limiting illustration, responsive to the first line feature being identified, determination component 112 may be configured to generate the first instruction for the set of instructions. Responsive to the second line feature being identified, determination component 112 may be configured to generate the second instruction for the set of instructions.

In some implementations, the set of instructions may include instructions for a group of virtual objects in the virtual object set. In some implementations, determination component 112 may be configured to generate instructions for the group of virtual objects in the virtual object set. A line feature of a line segment that intersects with, and/or are in proximity to, virtual objects of the group of objects may be associated with an instruction. The instruction associated with the line feature may be instructions for the group of virtual objects.

For example, line features of the first line segment may be associated with a fifth instruction, line features of the second line segment may be associated with a sixth instruction, and/or other line features of other line segments may be associated with other sixth instructions. The fifth instruction may be instructions for virtual objects of the first group of virtual objects specified by the first line segment. The sixth instruction may be instructions for virtual objects of the second group of virtual objects specified by the second line segment. The other instructions may be instructions for virtual objects of a group of virtual objects specified by the other line segments.

The set of instructions includes instructions to control/command one or more of the virtual objects of the virtual object set. In some implementations, the instructions of the set of instructions may include an instruction to select one or more virtual objects for the virtual object set, an instruction to move the virtual objects of the virtual object set and/or the group of virtual objects of the virtual object set, an instruction to group the virtual objects of the virtual object set and/or the group of virtual objects of the virtual object set together with other virtual objects, an instruction for the virtual objects of the virtual object set and/or the group of virtual objects of the virtual object set to interact with other virtual objects, an instruction for the virtual objects of the virtual object set and/or the group of virtual objects of the virtual object set to move to a location, an instruction for the virtual objects of the virtual object set and/or the group of virtual objects of the virtual object set to move along the path traced by the user, and/or other instructions for the virtual objects of the virtual object set and/or the group of virtual objects of the virtual object set.

The instruction for the virtual objects of the virtual object set and/or the group of virtual objects of the virtual object set to interact with other virtual objects includes instruction for the virtual objects of the virtual object set and/or the group of virtual objects of the virtual object set to interact with other virtual entities and/or virtual structures. In some implementations, the interaction may include attacking, defining, forming a group with, and/or other interaction with the other virtual entities.

The set of instructions may include instructions to generate one or more virtual objects. The generated virtual objects may be positioned within the topography of the simulated physical space of the application. In some implementations, the instructions to generate one or more virtual objects may include generating a copy of the virtual objects in the virtual object set.

In some implementations, determination component 112 may be configured to generate the set of instructions based on virtual objects in a virtual object set. A virtual object may have one or more predetermined functionalities. For example, a virtual structure of a building may be occupied, a virtual entity of a car may be driven, a virtual entity of a plane may fly, a virtual entity of a soldier may fight, and/or other virtual objects may have other functionalities. Responsive to identification and/or determination of a virtual object set, determination component 112 may be configured to generate the set of instructions based on the predetermined functionalities of the virtual objects for the virtual object set.

For example, a virtual object set may include the virtual structure of the building, the virtual entity of the car, the virtual entity of the plane, the virtual entity of the solider, and/or other virtual objects. Determination component 112 may be configured to generate the instructions only the building, the car, the plane, the soldier, and/or other virtual objects of the virtual object set may perform. For example, determination component 112 may be configured to generate the set of instructions to have the soldier occupy the building, the car to drive to a location of the simulated physical space, the plane to fly to a location of the simulated physical space, and/or other instructions based on the functionality of the virtual objects in the virtual object set.

In some implementations, determination component 112 may be configured to generate the set of instructions based on a combination of user gestures. For example, a first user gesture followed by a second user gesture may specify a third instruction, and/or other combination of user gestures may specify other instructions. In some implementations, determination component 112 may be configured to generate the set of instructions based on a combination of line features that make up the line defined by the path traced by the user. For example, a combination of the first line feature of the first line segment, the second line feature of the line segment, and/or other line features of other first line segments making up the line defined by the path traced by the user may specify a fourth instruction, and/or other combination of other line features may specify other instructions.

In some implementations, determination component 112 may be configured to determine a set of instructions of a navigation system executed on computing platform(s) 140. The set of instructions includes instructions to recommend a route in the real-world for interacting with the virtual object set, instructions to recommend a route in a simulated-world (e.g., a game environment/map) for interacting with the virtual object set, and/or other interaction. A recommended route may include a route based on time efficiency, a route based on distance, a route based on the mode of transportation, and/or other routes based on other preferences/criteria.

In some implementations, determination component 112 may be configured to determine a set of instructions for recommending a route may be determined based on the user gesture used to trace a path on a simulated physical space and/or line feature of the path. Instructions to recommend routes based on different preferences/criteria may be associated with different user gestures. For example, a first user gesture and/or the first line feature may be associated with a first instruction to recommend the route based on time efficiency, a second user gesture and/or the second line feature may be associated with a second instruction to recommend the route based on distance, and/or other user gestures and/or line features may be associated with other instructions to recommend other routes. Responsive to the first user gesture, the second user gesture, and/or other user gestures being identified, determination component 112 may be configured generate the first instruction, the second instruction, and/or other instructions.

Execution component 114 may be configured to execute the set of instructions on the application, and/or other information. In some implementations, execution component 114 may be configured to execute individual instructions of the set of instructions on the virtual objects. Execution component 114 may be configured to execute individual instructions of the set of instructions on the virtual objects specified by the instructions. For example, the first instruction of the set of instruction may be configured to be executed on all the virtual objects of the application, the fifth instruction of the set of instruction may be configured to be executed on the first group of virtual objects, and/or other instructions of the set of instructions may be configured to be executed on other virtual objects. Execution component 114 may be configured to execute the first instruction of the set of instruction on all the virtual objects of the application, the fifth instruction of the set of instruction on the first group of virtual objects, and/or other instructions of the set of instructions on other virtual objects.

Execution component 114 may be configured to provide computing platform(s) 140 with the set of instructions, and/or other information, such that computing platform(s) 140 may be enabled to execute the set of instructions on the application. The execution of the set of instructions includes presentation of the executed set of instructions on computing platform(s) 140. The executed set of instructions may be presented on the display of computing platform(s) 140.

In some implementations, server(s) 102, computing platform(s) 140, and/or external resource(s) 120 may be operatively linked via one or more electronic communication links. For example, such electronic communication links may be established, at least in part, via the network(s) 103 such as the Internet and/or other networks. It will be appreciated that this is not intended to be limiting, and that the scope of this disclosure includes implementations in which server(s) 102, computing platform(s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage 122, one or more processors 124, and/or other components. Server(s) 102 may include communication lines or ports to enable the exchange of information with a network and/or other computing devices. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage 122 may include electronic storage media that electronically stores information. The electronic storage media of electronic storage 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from computing platform(s) 140, and/or other information that enables server(s) 102 to function as described herein.

In some implementations, Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 2:
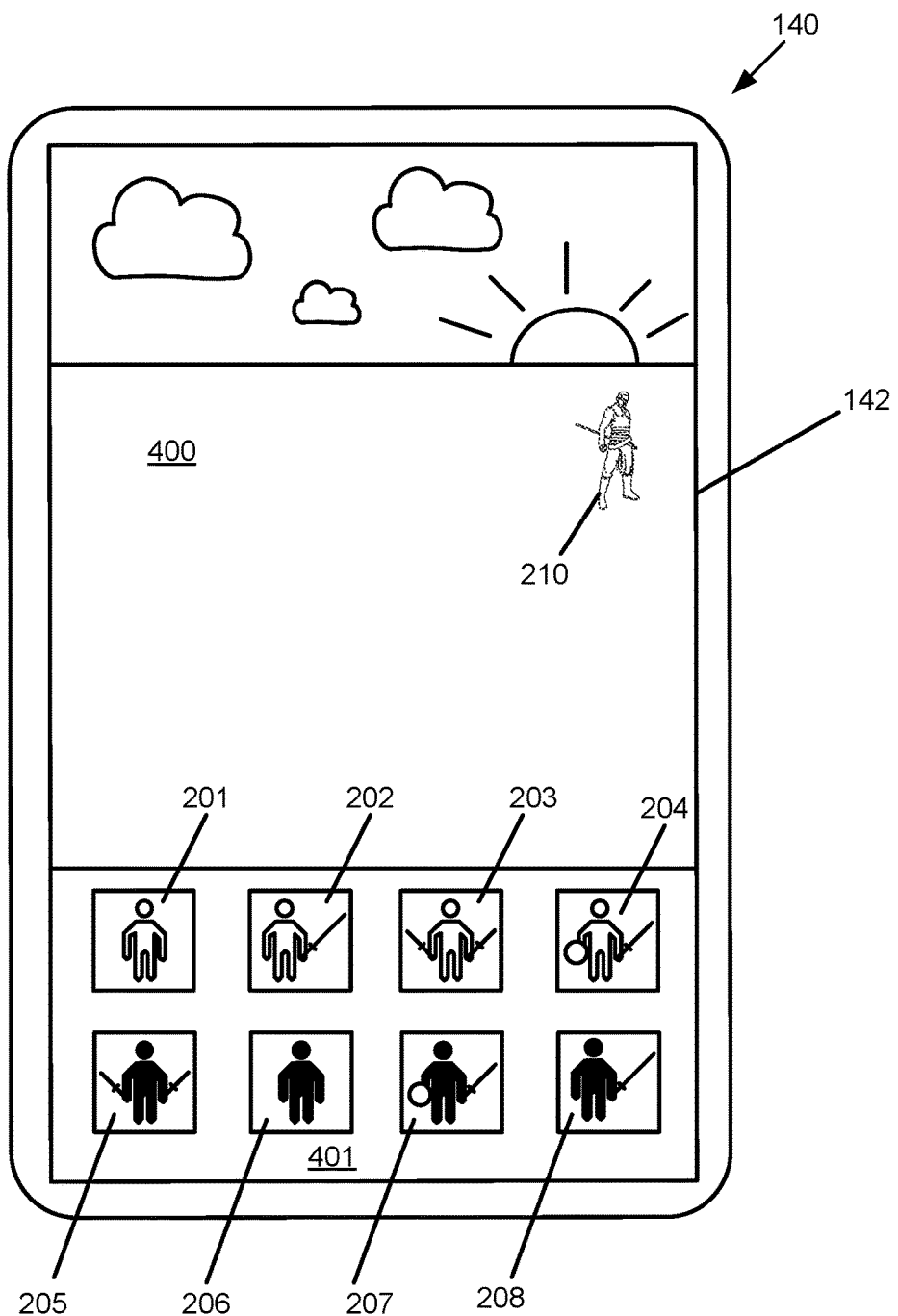
FIG. 2 illustrates a depiction of a game on a touch-enabled display of a computing platform, in accordance with one or more implementations.
Figure 3:
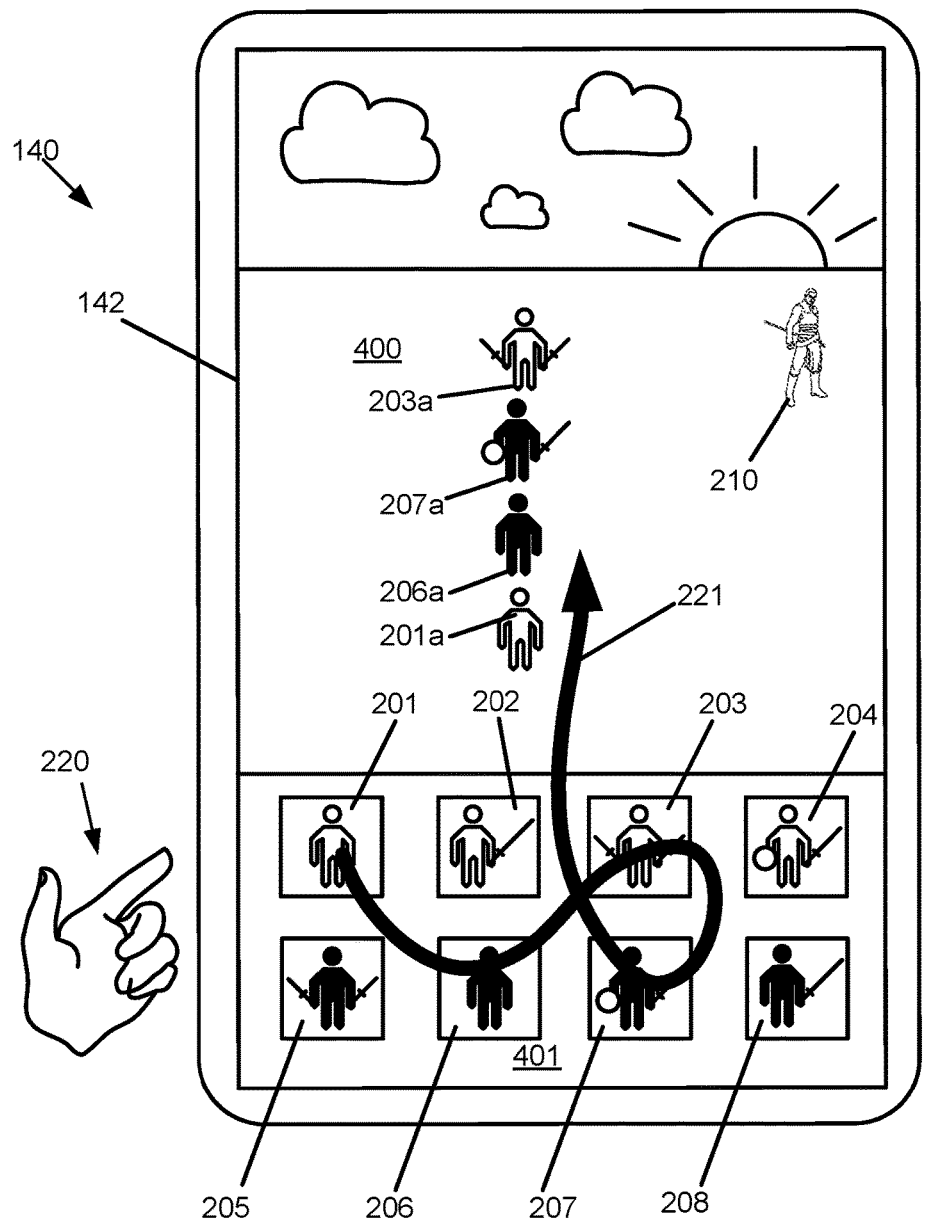
FIG. 3 illustrates a depiction of user input in the game on the touch-enabled display of the computing platform, in accordance with one or more implementations.
Figure 4:
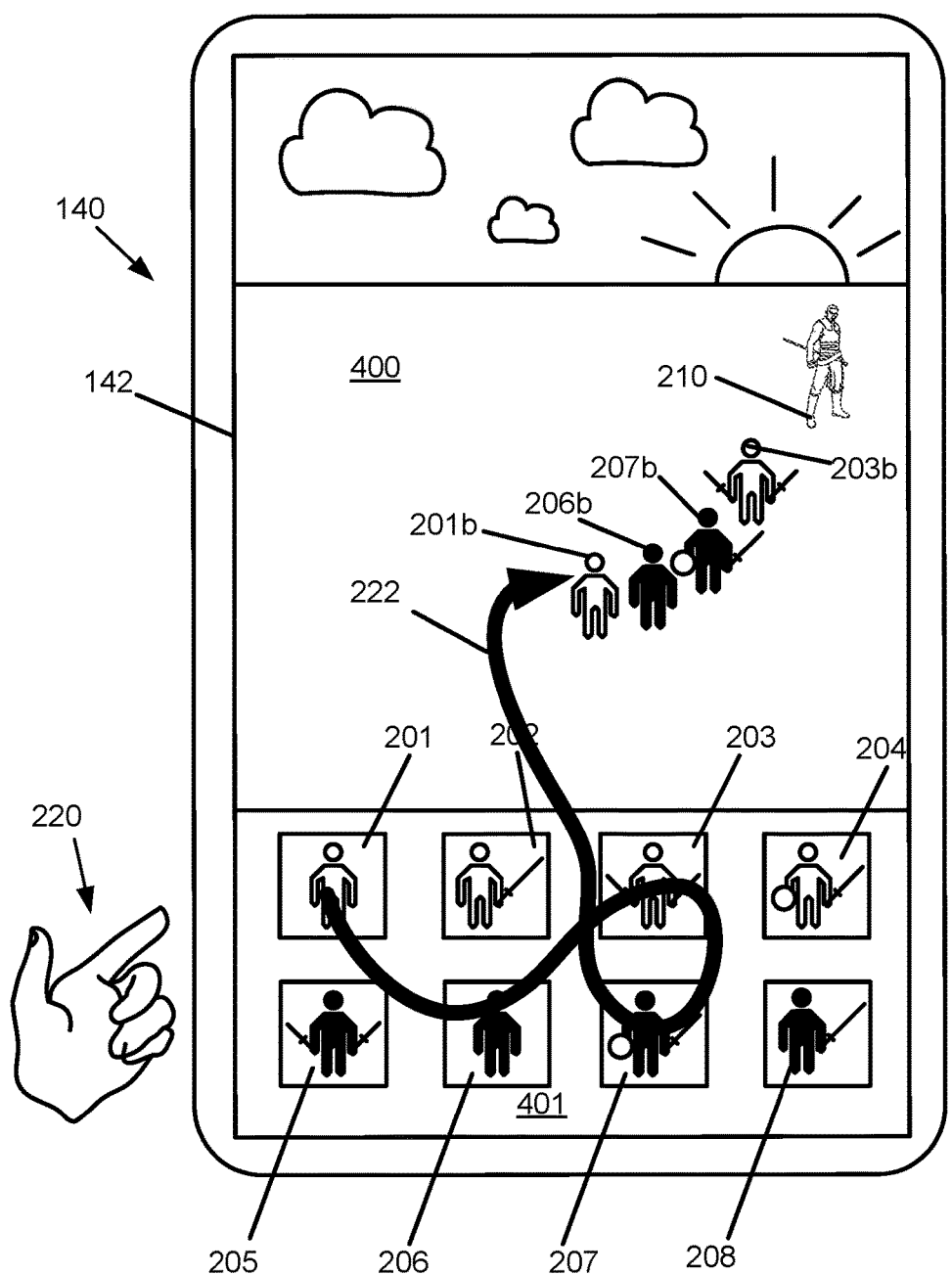
FIG. 4 illustrates a depiction of a set of instructions being executed in the game, in accordance with one or more implementations.

As is illustrated in FIG. 2-4, user inputs, including user touch gestures, may be interpreted to generate explicit instructions, and/or other information for a game. The game may be presented on touch-enabled input device 142 of computing platform(s) 140. Referring to FIG. 2, the game may include a simulated physical space 400 and a HUD 401. Simulated physical space 400 may be a map/environment of the game. HUD 401 may be positioned on the topography of simulated physical space 400. The game may include one or more virtual objects including virtual entities. The one or more virtual objects may be positioned on throughout topography of simulated physical space 400. The virtual entities include entity 201, 202, 203, 204, 205, 206, 207, 208, 210, and/or other virtual entities. Virtual entities 201, 202, 203, 204, 205, 206, 207, and 208 may be controlled by a user through user inputs, including user touch gestures. Virtual entities 210 may be a non-player character controlled by the game.

Referring to FIG. 3, a user 220 may trace a path 221 on touch-enabled input device 142 of computing platform(s) 140. Path 220 may define a continuous line. Path 221 may be mapped onto/associated with the simulated physical space 400. Path 221 may intersect with, and/or are in proximity to, virtual entity 201, 203, 206, and 207. The continuous line defined by path 221 comprises of two line features specifying two line segments, including a first line feature specifying a first line segment in the area occupied HUD 401 and a second line feature specifying a second line segment in the area outside of HUD 401 and on simulated physical space 400. The first line feature may specify a first instruction to select virtual entity 201, 203, 206, and 207 for a virtual object set. The second line feature may specify a second instruction to place copies of virtual entity 201, 203, 206, and 207 on simulated physical space 400 moving in the direction the second line segment of path 221 is traced. The copies of virtual entity 201, 203, 206, and 207 are shown as virtual entity 201*a*, 203*a*, 206*a*, and 207*a*. The first and second instructions are executed in the game as depicted in FIG. 3.

Referring to FIG. 4, user 220 may trace a path 222 on touch-enabled input device 142 of computing platform(s) 140. Path 222 may define a continuous line. Path 222 may be mapped onto/associated with the simulated physical space 400. Path 222 may intersect with, and/or are in proximity to, virtual entity 201, 203, 206, and 207. The continuous line defined by path 222 comprises of two line features specifying two line segments, including a third line feature specifying a third line segment in the area occupied HUD 401 and a fourth line feature specifying a fourth line segment in the area outside of HUD 401 and on simulated physical space 400. The third line feature may specify a third instruction to select virtual entity 201, 203, 206, and 207 for a virtual object set. The fourth line feature may specify a fourth instruction to place copies of virtual entity 201, 203, 206, and 207 on simulated physical space 400 moving in the direction the fourth line segment of path 222 is traced. The copies of virtual entity 201, 203, 206, and 207 are shown as virtual entity 201*b*, 203*b*, 206*b*, and 207*b*. The third and fourth instructions are executed in the game as depicted in FIG. 4.

Figure 5:
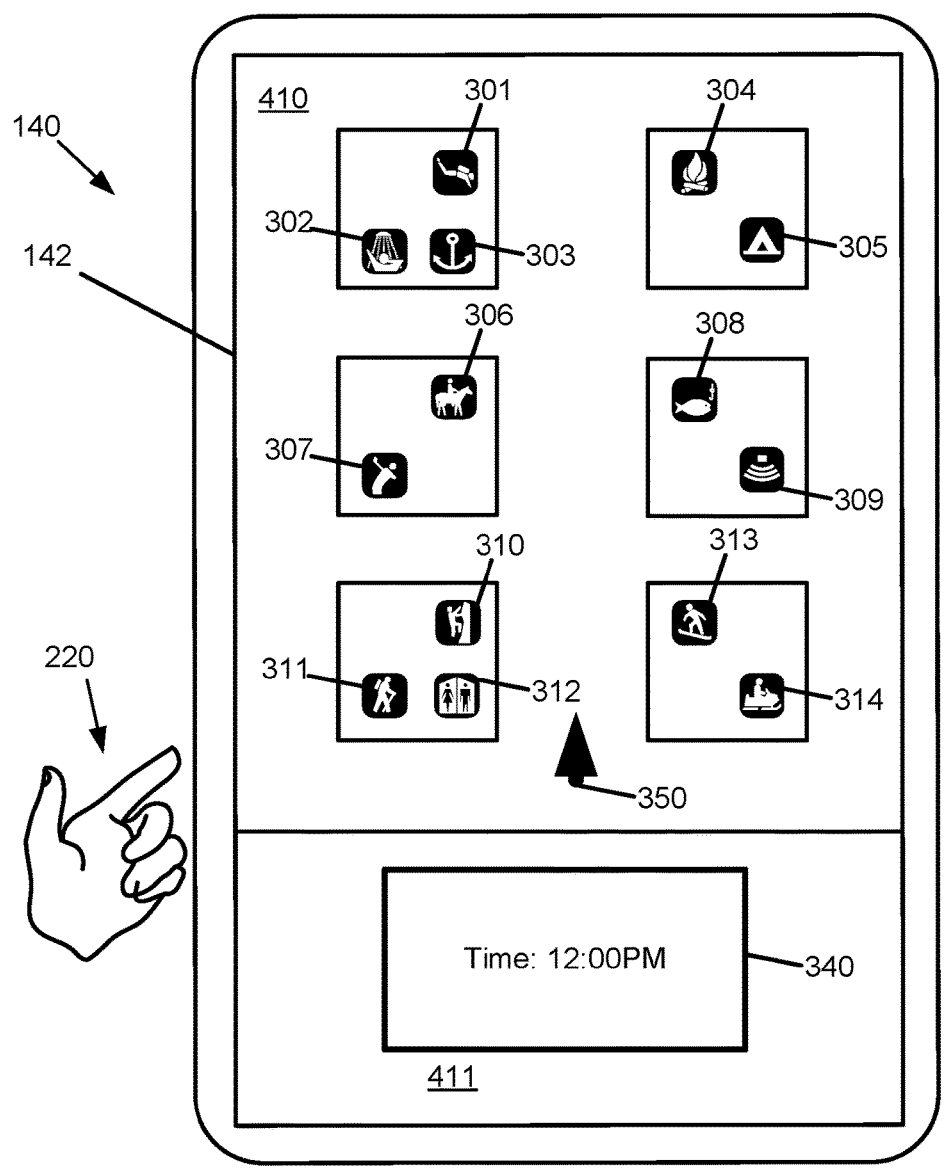
FIG. 5 illustrates a depiction of a navigation system on a touch-enabled display of a computing platform, in accordance with one or more implementations.
Figure 6:
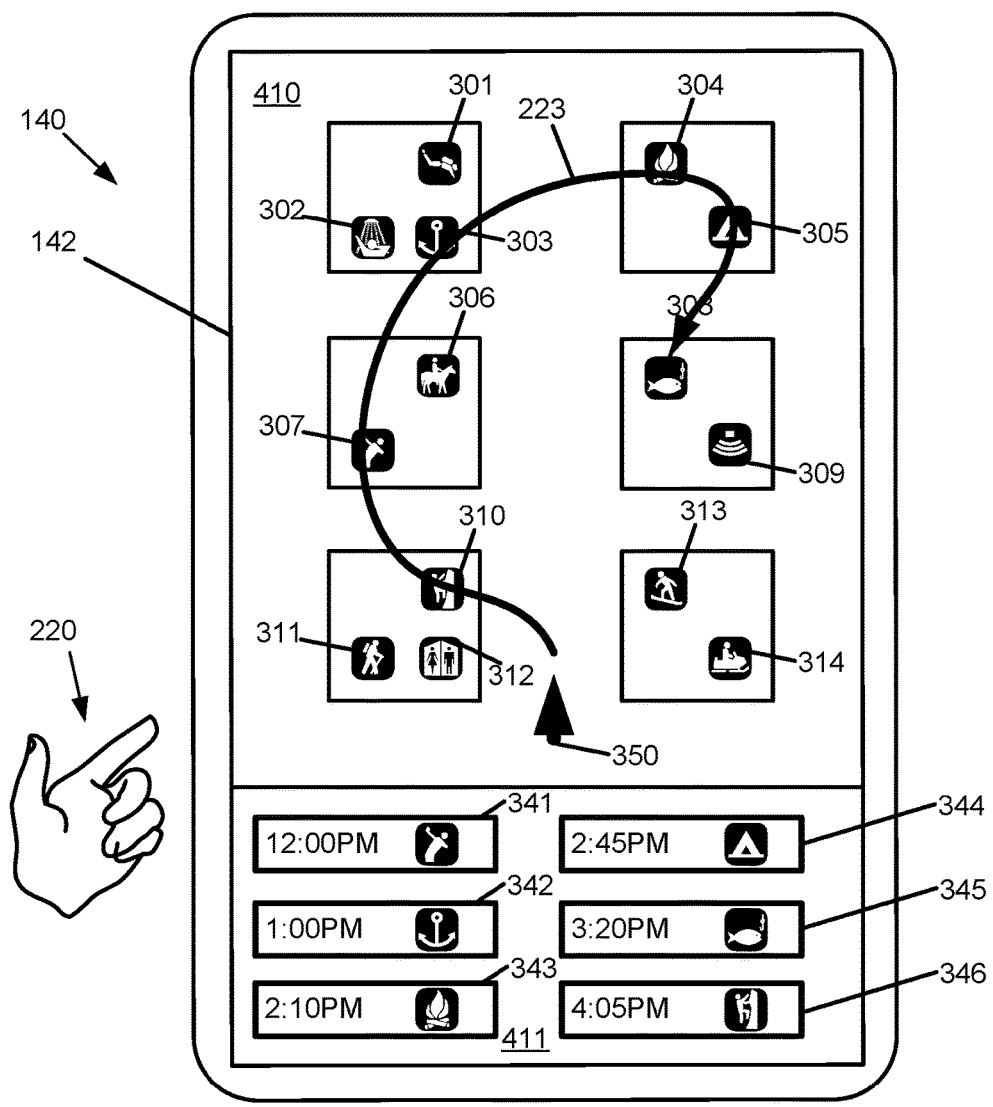
FIG. 6 illustrates a depiction of user input in the navigation system on the touch-enabled display of the computing platform, in accordance with one or more implementations.

As is illustrated in FIG. 5-6, user inputs, including user touch gestures, may be interpreted to generate explicit instructions, and/or other information for a navigation system. The navigation system may be presented on touch-enabled input device 142 of computing platform(s) 140. Referring to FIG. 5, the navigation system may include a simulated physical space 410 and a HUD 411. Simulated physical space 410 may be a map of the real-world. HUD 411 may be positioned on the topography of simulated physical space 410. HUB 411 may including display information such as time 340 for user 220. The navigation system may include one or more virtual objects including virtual structures and/or entities. The one or more virtual objects may be positioned on throughout topography of simulated physical space 400. The virtual structures include structure 304, 302, 303, 304, 305, 306, 307, 308, 309, 310, 311, 312, 313, 314, and/or other virtual structures. The virtual entities may include virtual entity 350 and/or other virtual entity. The virtual entity 350 may represent the user 220. The location of virtual entity 350 on the map represents the location of user 220 in the real world. The virtual structures may have real world equivalents that a user can physically visit.

Referring to FIG. 6, user 220 may trace a path 223 on touch-enabled input device 142 of computing platform(s) 140. Path 223 may define a continuous line. Path 223 may be mapped onto/associated with the simulated physical space 400. Path 223 may intersect with, and/or are in proximity to, virtual structure 303, 304, 305, 307, 308, and 310. The virtual structure that may intersect with, and/or are in proximity to, path 223 may indicate the virtual structures user 220 would like to visit. Line features of path 223 may specify an instruction to recommend a most time efficient route to interact with virtual structure 303, 304, 305, 307, 308, and 310. The recommendation for the most time-efficient route to interact with virtual structure 303, 304, 305, 307, 308, and 310 may be presented on HUD 411. The recommendation includes recommendation 341, 342, 343, 344, 345, and 346. Recommendation 341 may recommend the best time to visit the real-world equivalent of virtual structure 307. Recommendation 342 may recommend the best time to visit the real-world equivalent of virtual structure 303. Recommendation 343 may recommend the best time to visit the real-world equivalent of virtual structure 304. Recommendation 344 may recommend the best time to visit the real-world equivalent of virtual structure 305. Recommendation 345 may recommend the best time to visit the real-world equivalent of virtual structure 308. Recommendation 346 may recommend the best time to visit the real-world equivalent of virtual structure 310.

Figure 7:
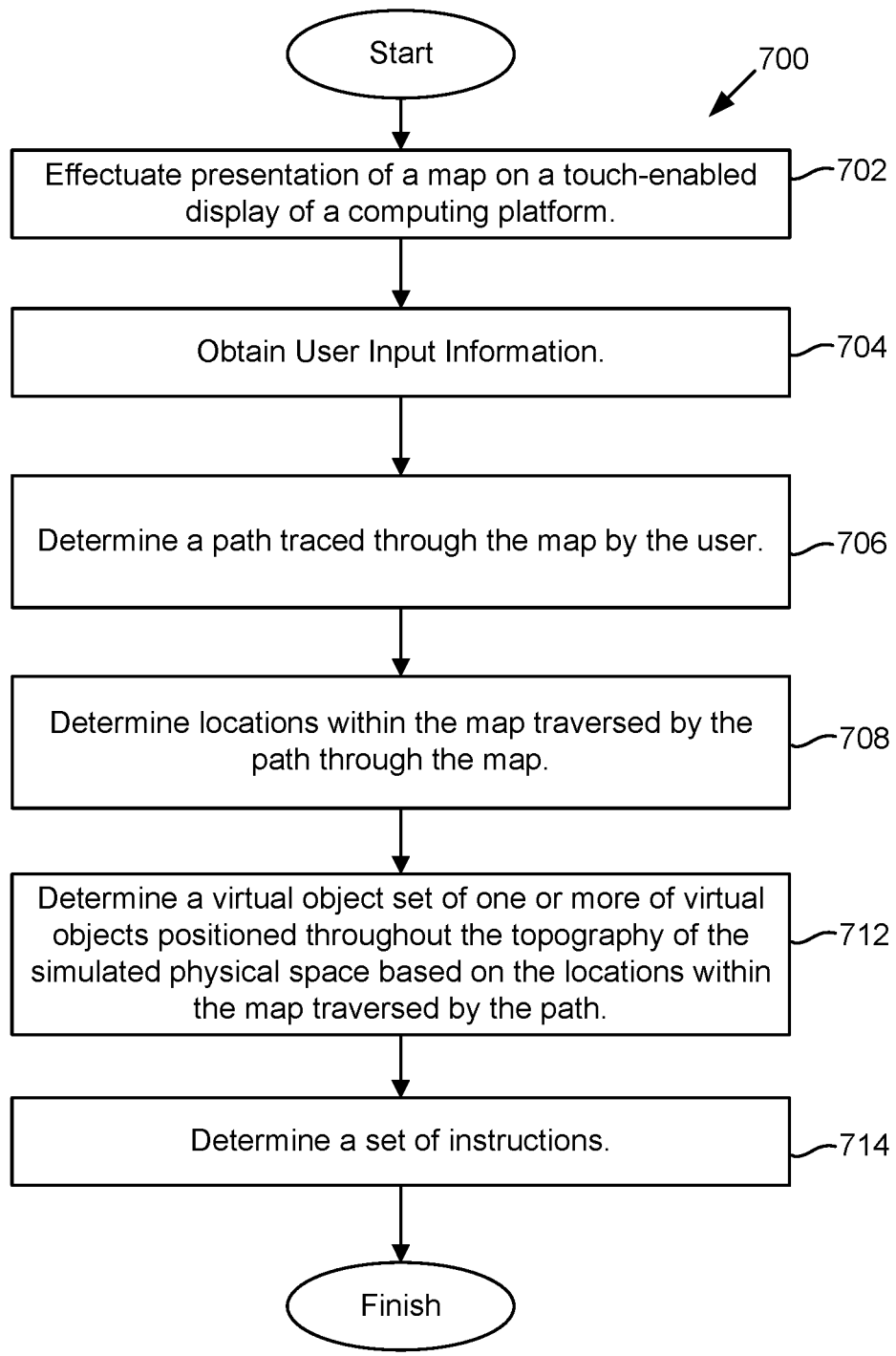
FIG. 7 illustrates a method configured to interpret user input, including touch gesture inputs, to generate explicit instructions for an application program running on a computing platform, in accordance with one or more implementations.

FIG. 7 illustrates the method 700, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below are not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, presentation of a map on a touch-enabled display of a computing platform may be effectuated. The map including a depiction of a simulated physical space of a game executed by the computing platform and a depiction one or more virtual objects. The one or more virtual objects may be positioned throughout a topography of the simulated physical space. In some embodiments, operation 702 is performed by a presentation component the same as or similar to presentation component 106 (shown in FIG. 1 and described herein).

At an operation 704, user input information may be obtained. The user input information indicating user interaction of a user with the touch-enabled display. In some embodiments, operation 704 is performed by an input component the same as or similar to input component 108 (shown in FIG. 1 and described herein).

At an operation 706, a path traced through the map by the user may be determined from the user interaction. In some embodiments, operation 706 is performed by an analysis component the same as or similar to analysis component 110 (shown in FIG. 1 and described herein).

At an operation 708, locations within the map traversed by the path through the map may be determined. In some embodiments, operation 708 is performed by the analysis component the same as or similar to analysis component 110 (shown in FIG. 1 and described herein).

At an operation 710, a virtual object set of one or more of the virtual objects positioned throughout the topography of the simulated physical space based on the locations within the map traversed by the path may be determined. The virtual object set may comprise of individual virtual objects that intersect with, and/or are in proximity to, the locations within the map traversed by the path. In some embodiments, operation 710 is performed by the analysis component the same as or similar to analysis component 110 (shown in FIG. 1 and described herein).

At an operation 712, a set of instructions for the game executed by the computing platform based on the virtual object set and the location within the simulated physical space traversed by the path may be determined. The set of instructions specifying the virtual object set. In some embodiments, operation 712 is performed by a determination component the same as or similar to determination component 112 (shown in FIG. 1 and described herein).

At an operation 714, the game based on the set of instructions may be executed. The execution of the game based on the set of instructions may be reflected in the presentation of the map by the computing platform. In some embodiments, operation 714 is performed by an execution component the same as or similar to execution component 114 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to interpret user gestures to generate explicit instructions, the system comprising:
   one or more physical processors configured by machine-readable instructions to:
   effectuate presentation of a map on a touch-enabled display of a computing platform, the map including a depiction of a simulated physical space of a game executed by the computing platform and a depiction one or more virtual objects positioned throughout a topography of the simulated physical space;
   obtain user input information, the user input information indicating user interaction of a user with the touch-enabled display;
   determine, from the user interaction, a path traced through the map by the user;
   determine locations within the map traversed by the path through the map;
   determine a virtual object set of one or more of the virtual objects positioned throughout the topography of the simulated physical space based on the locations within the map traversed by the path, the virtual object set comprising individual virtual objects that intersect with, and/or are in proximity to, the locations within the map traversed by the path;
   determine a set of instructions for the game executed by the computing platform based on the virtual object set and the locations within the simulated physical space traversed by the path, the set of instructions specifying the virtual object set; and execute the game based on the set of instructions, wherein the execution of the game based on the set of instructions is reflected in the presentation of the map by the computing platform.

2. The system of claim 1, wherein a threshold distance specifies a minimum distance for a virtual object to be in proximity to the locations within the map traversed by the path.

3. The system of claim 1, wherein the set of instructions further specifies an instruction to be performed by the virtual objects of the virtual object set, the instruction performed by the virtual objects of the virtual object set being based on functionality of the individual virtual objects of the virtual object set and/or the location of the individual virtual objects of the virtual object set within the simulated physical space.

4. The system of claim 1, wherein the one or more physical processors are further configured by machine-readable instructions to:
   identify presence of one or more gestures made by the user while tracing the path;
   determine the one or more gestures made by the user based on the locations within the map traversed by the path; and
   determine, based on the one or more gestures, the set of instructions to include one or more instructions to be performed by the virtual objects of the virtual object set.

5. The system of claim 4, wherein individual gestures specify performance of individual instructions and/or combinations of gestures specify performance of the individual instructions.

6. The system of claim 4, wherein the individual gestures include one or more of a finger press, a finger tap, a finger swipe, a finger flick, a finger drag, a pinch, a touch-and-hold, or a scroll.

7. The system of claim 1, wherein presentation of the map by the computing platform includes a suggestion for interacting with the individual virtual objects of the virtual object set.

8. A method configured to interpret user gestures to generate explicit instructions, the method comprising:
   effectuating presentation of a map on a touch-enabled display of a computing platform, the map including a depiction of a simulated physical space of a game executed by the computing platform and a depiction one or more virtual objects positioned throughout a topography of the simulated physical space;
   obtaining user input information, the user input information indicating user interaction of a user with the touch-enabled display;
   determining, from the user interaction, a path traced through the map by the user;
   determining locations within the map traversed by the path through the map;
   determining a virtual object set of one or more of the virtual objects positioned throughout the topography of the simulated physical space based on the locations within the map traversed by the path, the virtual object set comprising individual virtual objects that intersect with, and/or are in proximity to, the locations within the map traversed by the path;
   determining a set of instructions for the game executed by the computing platform based on the virtual object set and the locations within the simulated physical space traversed by the path, the set of instructions specifying the virtual object set; and
   executing the game based on the set of instructions, wherein the execution of the game based on the set of instructions is reflected in the presentation of the map by the computing platform.

9. The method of claim 8, wherein a threshold distance specifies a minimum distance for a virtual object to be in proximity to the locations within the map traversed by the path.

10. The method of claim 8, wherein the set of instructions further specifies an instruction to be performed by the virtual objects of the virtual object set, the instruction performed by the virtual objects of the virtual object set being based on functionality of the individual virtual objects of the virtual object set and/or the location of the individual virtual objects of the virtual object set within the simulated physical space.

11. The method of claim 8, wherein the method further comprises of:
    identifying presence of one or more gestures made by the user while tracing the path;
    determining the one or more gestures made by the user based on the locations within the map traversed by the path; and
    determining, based on the one or more gestures, the set of instructions to include one or more instructions to be performed by the virtual objects of the virtual object set.

12. The method of claim 11, wherein individual gestures specify performance of individual instructions and/or combinations of gestures specify performance of the individual instructions.

13. The method of claim 11, wherein the individual gestures include one or more of a finger press, a finger tap, a finger swipe, a finger flick, a finger drag, a pinch, a touch-and-hold, or a scroll.

14. The method of claim 8, wherein presentation of the map by the computing platform includes a suggestion for interacting with the individual virtual objects of the virtual object set.

15. A system configured to interpret user gestures to generate explicit instructions, the system comprising:
    one or more physical processors configured by machine-readable instructions to:
      effectuate presentation of a map on a touch-enabled display of a computing platform, the map including a depiction of a simulated physical space of a application executed by the computing platform and a depiction one or more virtual objects positioned throughout a topography of the simulated physical space;
      obtain user input information, the user input information indicating user interaction of a user with the touch-enabled display;
      determine, from the user interaction, a path traced through the map by the user;
      determine locations within the map traversed by the path through the map;
      determine a virtual object set of one or more of the virtual objects positioned throughout the topography of the simulated physical space based on the locations within the map traversed by the path, the virtual object set comprising individual virtual objects that intersect with, and/or are in proximity to, the locations within the map traversed by the path;
      determine a set of instructions for the application executed by the computing platform based on the virtual object set and the locations within the simulated physical space traversed by the path, the set of instructions specifying the virtual object set; and execute the application based on the set of instructions, wherein the execution of the application based on the set of instructions is reflected in the presentation of the map by the computing platform.

16. The system of claim 15, wherein a threshold distance specifies a minimum distance for a virtual object to be in proximity to the locations within the map traversed by the path.

17. The system of claim 15, wherein the set of instructions further specifies an instruction to be performed by the virtual objects of the virtual object set, the instruction performed by the virtual objects of the virtual object set being based on functionality of the individual virtual objects of the virtual object set and/or the location of the individual virtual objects of the virtual object set within the simulated physical space.

18. The system of claim 15, wherein the one or more physical processors are further configured by machine-readable instructions to:

identify presence of one or more gestures made by the user while tracing the path;

determine the one or more gestures made by the user based on the locations within the map traversed by the path; and determine, based on the one or more gestures, the set of instructions to include one or more instructions to be performed by the virtual objects of the virtual object set.

19. The system of claim 18, wherein individual gestures specify performance of individual instructions and/or combinations of gestures specify performance of the individual instructions.

20. The system of claim 18, wherein the individual gestures include one or more of a finger press, a finger tap, a finger swipe, a finger flick, a finger drag, a pinch, a touch-and-hold, or a scroll.

* * * * *